US009652631B2

(12) United States Patent
Novak et al.

(10) Patent No.: US 9,652,631 B2
(45) Date of Patent: May 16, 2017

(54) SECURE TRANSPORT OF ENCRYPTED VIRTUAL MACHINES WITH CONTINUOUS OWNER ACCESS

(71) Applicant: Microsoft Technology Licensing, LLC, Redmond, WA (US)

(72) Inventors: Mark Fishel Novak, Newcastle, WA (US); Nir Ben-Zvi, Bellevue, WA (US); Niels T. Ferguson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 101 days.

(21) Appl. No.: 14/481,399

(22) Filed: Sep. 9, 2014

(65) Prior Publication Data
US 2015/0318986 A1 Nov. 5, 2015

Related U.S. Application Data

(60) Provisional application No. 61/988,786, filed on May 5, 2014.

(51) Int. Cl.
*H04L 29/06* (2006.01)
*H04L 9/08* (2006.01)
(Continued)

(52) U.S. Cl.
CPC ...... *G06F 21/6281* (2013.01); *G06F 9/45558* (2013.01); *G06F 12/08* (2013.01);
(Continued)

(58) Field of Classification Search
CPC ... H04L 63/0823; H04L 63/12; H04L 63/062; H04L 9/0822; H04L 9/0894;
(Continued)

(56) References Cited

U.S. PATENT DOCUMENTS 7,380,119 B2   5/2008  Bade et al.
7,836,299 B2  11/2010  England et al.
(Continued)

FOREIGN PATENT DOCUMENTS

EP    2577539      4/2013
WO    0163831 A1  8/2001
(Continued)

OTHER PUBLICATIONS

"International Search Report & Written Opinion Received for PCT Patent Application No. PCT/US2015/028991", Mailed Date: Aug. 20, 2015, 9 Pages.
(Continued)

*Primary Examiner* — Joseph P Hirl
*Assistant Examiner* — Thomas Gyorfi
(74) *Attorney, Agent, or Firm* — Workman Nydegger

(57) ABSTRACT

Managing encrypted datasets is illustrated. A method includes obtaining a first decryption key. The first decryption key is configured to be used to decrypt an encrypted dataset that has been encrypted using a first encryption mechanism. The first encryption mechanism is associated with the first decryption key that can be used to decrypt the dataset. The method further includes encrypting the first decryption key with a second encryption mechanism. The method further includes encrypting the first decryption key with a third encryption mechanism. The method further includes creating a package including at least the first decryption key encrypted with the second encryption method and the first decryption key encrypted with the third encryption method. The method further includes signing the package with a guardian signature and signing the package with a signature created from the first decryption key.

23 Claims, 7 Drawing Sheets

(51) Int. Cl.
*G06F 21/62* (2013.01)
*H04L 9/32* (2006.01)
*G06F 21/57* (2013.01)
*H04W 12/10* (2009.01)
*G06F 12/08* (2016.01)
*G06F 9/455* (2006.01)

(52) U.S. Cl.
CPC .......... *G06F 21/57* (2013.01); *G06F 21/6209* (2013.01); *H04L 9/0822* (2013.01); *H04L 9/0894* (2013.01); *H04L 9/3247* (2013.01); *H04L 63/0428* (2013.01); *H04L 63/062* (2013.01); *H04L 63/0823* (2013.01); *H04L 63/12* (2013.01); *H04W 12/10* (2013.01); *G06F 2009/4557* (2013.01); *G06F 2009/45583* (2013.01); *G06F 2009/45587* (2013.01); *G06F 2009/45595* (2013.01); *G06F 2212/652* (2013.01); *H04L 2209/127* (2013.01); *H04L 2209/24* (2013.01); *H04L 2209/72* (2013.01); *H04L 2463/062* (2013.01)

(58) Field of Classification Search
CPC ............... H04L 9/3247; H04L 2209/24; H04L 2209/72; H04L 2209/127; H04L 2463/062; G06F 21/6209; G06F 21/57; G06F 2009/4557; G06F 2009/45587; G06F 2009/45595; G06F 9/45558
See application file for complete search history.

(56) References Cited

U.S. PATENT DOCUMENTS

| | | | |
|---|---|---|---|
| 8,060,876 B2 | 11/2011 | Smith et al. | |
| 8,065,713 B1* | 11/2011 | Vainstein | H04L 63/102 |
| | | | 713/168 |
| 8,074,262 B2 | 12/2011 | Scarlata | |
| 8,151,262 B2 | 4/2012 | Challener et al. | |
| 8,208,637 B2 | 6/2012 | Ellison | |
| 8,249,257 B2 | 8/2012 | Brutch et al. | |
| 8,341,427 B2 | 12/2012 | Auradkar et al. | |
| 8,356,347 B2 | 1/2013 | Berger et al. | |
| 8,375,437 B2 | 2/2013 | Linsley et al. | |
| 8,411,863 B2 | 4/2013 | Ureche et al. | |
| 8,732,462 B2* | 5/2014 | Bhathena | H04L 9/0825 |
| | | | 713/156 |
| 8,909,939 B1 | 12/2014 | Beda, III et al. | |
| 9,172,683 B2* | 10/2015 | Farrugia | H04L 63/0428 |
| 2001/0055396 A1* | 12/2001 | Jevans | H04L 63/0428 |
| | | | 380/282 |
| 2003/0226031 A1 | 12/2003 | Proudler et al. | |
| 2005/0166051 A1 | 7/2005 | Buer | |
| 2006/0020781 A1 | 1/2006 | Scarlata et al. | |
| 2006/0126836 A1* | 6/2006 | Rivas | H04L 9/0891 |
| | | | 380/47 |
| 2006/0155988 A1 | 7/2006 | Hunter et al. | |
| 2006/0256108 A1 | 11/2006 | Scaralata | |
| 2007/0016801 A1 | 1/2007 | Bade et al. | |
| 2007/0094719 A1* | 4/2007 | Scarlata | G06F 21/53 |
| | | | 726/9 |
| 2008/0046581 A1 | 2/2008 | Molina et al. | |
| 2008/0209221 A1 | 8/2008 | Vennelakanti et al. | |
| 2008/0244569 A1 | 10/2008 | Challenger et al. | |
| 2009/0064292 A1 | 3/2009 | Carter et al. | |
| 2009/0086979 A1 | 4/2009 | Brutch et al. | |
| 2009/0125974 A1 | 5/2009 | Zhang et al. | |
| 2009/0154709 A1 | 6/2009 | Ellison | |
| 2009/0204964 A1 | 8/2009 | Foley | |
| 2009/0271618 A1 | 10/2009 | Camenisch et al. | |
| 2009/0307487 A1 | 12/2009 | Movva et al. | |
| 2010/0082960 A1 | 4/2010 | Grobman et al. | |
| 2010/0325628 A1 | 12/2010 | Haga et al. | |
| 2011/0029672 A1 | 2/2011 | Agneeswaran | |
| 2011/0154031 A1 | 6/2011 | Banerjee et al. | |
| 2011/0202916 A1 | 8/2011 | VoBa et al. | |
| 2011/0246757 A1 | 10/2011 | Prakash et al. | |
| 2011/0302415 A1 | 12/2011 | Ahmad et al. | |
| 2012/0030676 A1 | 2/2012 | Smith et al. | |
| 2012/0089831 A1 | 4/2012 | Rozas | |
| 2012/0117565 A1 | 5/2012 | Staelin et al. | |
| 2012/0204020 A1 | 8/2012 | Novak et al. | |
| 2012/0265976 A1 | 10/2012 | Spiers et al. | |
| 2012/0328105 A1 | 12/2012 | Mukkara et al. | |
| 2013/0054979 A1 | 2/2013 | Basmov et al. | |
| 2013/0086383 A1 | 4/2013 | Galvao de Andrade et al. | |
| 2013/0097296 A1 | 4/2013 | Gehrmann et al. | |
| 2013/0191648 A1 | 7/2013 | Bursell | |
| 2014/0007087 A1 | 1/2014 | Scott-Nash et al. | |
| 2014/0019753 A1 | 1/2014 | Lowry et al. | |
| 2014/0019959 A1 | 1/2014 | Dodgson et al. | |
| 2014/0025961 A1 | 1/2014 | Mackintosh et al. | |
| 2014/0052877 A1 | 2/2014 | Mao | |
| 2014/0075494 A1 | 3/2014 | Fadida et al. | |
| 2014/0089658 A1 | 3/2014 | Raghuram et al. | |
| 2014/0089660 A1 | 3/2014 | Sarangshar et al. | |
| 2014/0095868 A1 | 4/2014 | Korthny et al. | |
| 2014/0108784 A1 | 4/2014 | Pendarakis et al. | |
| 2014/0173279 A1 | 6/2014 | Goodman et al. | |
| 2014/0201525 A1 | 7/2014 | Korthny et al. | |
| 2014/0281497 A1 | 9/2014 | Medvinsky et al. | |
| 2015/0019864 A1 | 1/2015 | Pate | |
| 2015/0127795 A1 | 5/2015 | Jagana et al. | |
| 2015/0134965 A1 | 5/2015 | Morenius et al. | |
| 2015/0135311 A1 | 5/2015 | MacKintosh et al. | |
| 2015/0143508 A1 | 5/2015 | Halibard | |
| 2015/0178504 A1 | 6/2015 | Nystrom et al. | |
| 2015/0188917 A1 | 7/2015 | McCarron et al. | |
| 2015/0319160 A1 | 11/2015 | Ferguson et al. | |
| 2016/0140343 A1 | 5/2016 | Novak et al. | |
| 2016/0357988 A1 | 12/2016 | Ferguson et al. | |

FOREIGN PATENT DOCUMENTS

| | | |
|---|---|---|
| WO | WO 2007087558 | 8/2007 |
| WO | 2009123640 | 10/2009 |
| WO | WO 2012024508 | 2/2012 |

OTHER PUBLICATIONS

"Second Written Opinion Issued in PCT Application No. PCT/US2015/28995", Mailed Date : Mar. 16, 2016, 5 Pages.
Office Action dated May 5, 2016 cited in U.S. Appl. No. 14/542,341.
"International Preliminary Report on Patentability Issued in PCT Application No. PCT/US2015/28991", Mailed Date: Apr. 4, 2016, 7 Pages.
Notice of Allowance dated May 25, 2016 cited in U.S. Appl. No. 14/504,096.
U.S. Appl. No. 14/140,214, Nystrom, et al., "Virtual Machine Assurances", filed Dec. 24, 2013.
Aslam, et al., "Securely Launching Virtual Machines on Trustworthy Platforms in a Public Cloud—An Enterprise's Perspective", In Proceedings of the 2nd International Conference on Cloud Computing and Services Science, Apr. 18, 2012, 10 pages.
Berger, et al., "vTPM: Virtualizing the Trusted Platform Module", In Proceedings of the 15th Conference on USENIX Security Symposium, vol. 15, Article No. 21, Jul. 31, 2006, 16 pages.
Goyette, Rich, "A Review of vTPM: Virtualizing the Trusted Platform Module", In Proceedings of Network Security and Cryptography, Nov. 13, 2007, 4 pages.
U.S. Appl. No. 14/542,341, filed Nov. 14, 2014, Novak et al.
U.S. Appl. No. 61/988,786, filed May 5, 2014, Nystrom et al.
"International Search Report and Written Opinion Issued in PCT Patent Application No. PCT/US2014/071773", Mailed Date: Mar. 23, 2015, 10 pages.
"International Preliminary Report on Patentability Issued in PCT Patent Application No. PCT/US2014/071773", Mailed Date: Nov. 19, 2015, 8 pages.
Garfinkel, et al., "Terra: A Virtual Machine-Based Platform for Trusted Computing", In Proceedings of the 19th ACM symposium on Operating systems principles, Oct. 19, 2003, 14 pages.

(56) References Cited

OTHER PUBLICATIONS

Berger, et al., "Security for the Cloud Infrastructure: Trusted Virtual Data Center Implementation", In Proceedings of IBM Journal of Research and Development, vol. 53, Issue 4, Jul. 2009, 12 pages.
Olzak, Tom, "Chapter 8—UEFI and the TPM: Building a foundation for platform trust", Published on: Jun. 19, 2012. Available at <<http://www.wayback.archive.org/web/20131018023117/http:/resources.infosecinstitute.com/uefi-and-tpm-2>>.
"International Search Report & Written Opinion Issued in PCT Application No. PCT/US2015/28995", Mailed Date: Aug. 26, 2015, 11 Pages.
U.S. Appl. No. 14/140,214, Feb. 12, 2016, Office Action.
"Second Written Opinion Issued in PCT Application No. PCT/US2015/058700", Mailed Date: Sep. 28, 2016, 6 Pages.
Notice of Allowance dated Oct. 20, 2016 cited in U.S. Appl. No. 14/504,096.
International Preliminary Report on Patentability for PCT Application No. PCT/US2015/028995, mailed Aug. 4, 2016.
Notice of Allowance dated Aug. 18, 2016 cited in U.S. Appl. No. 14/140,214.
Notice of Allowance dated Aug. 19, 2016 cited in U.S. Appl. No. 14/542,341.
International Search Report and Written Opinion for PCT Application No. PCT/US2015/058700, mailed Jul. 18, 2016.
International Preliminary Report on Patentability for PCT Application No. PCT/US2015/058700, mailed Jan. 20, 2017.

\* cited by examiner

SECURE TRANSPORT OF ENCRYPTED VIRTUAL MACHINES WITH CONTINUOUS OWNER ACCESS

CROSS-REFERENCE TO RELATED APPLICATIONS

This application claims the benefit of U.S. Provisional application 61/988,786 filed May 5, 2014, titled "SECURE MANAGEMENT OF OPERATIONS ON PROTECTED VIRTUAL MACHINES", which is incorporated herein by reference in its entirety.

BACKGROUND

Background and Relevant Art

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web based services for communicating back and forth with clients.

In cloud computing environments, a tenant may include a user, company, department of a company or other entity that has rights to access one or more of the virtual machines deployed at a datacenter run by a cloud service provider. A tenant may wish to have virtual machines deployed on its behalf. However, the tenant may wish to prevent other entities (such as other tenants, eavesdroppers, or even datacenter administrators) from being able to access its virtual machines while those machines are in storage prior to being deployed on a host at a datacenter or when the virtual machines are being deployed to a host in the datacenter. To accomplish this, the virtual machine may be encrypted, such as by encrypting a virtual hard drive and/or the metadata for the virtual machine. Thus, an encrypted virtual machine will move in and out of offline storage and between hosts in a manner that preserves confidentiality and integrity of its contents. Further, the key used to encrypt the contents of the virtual machine may have to be rolled over (i.e. changed) with some regularity. This may present challenges for an owner of a virtual machine being able to access their encrypted virtual machines.

However, there may be some desire to have the virtual machine both able to be deployed at the host and available for retrieval and execution by the owner (e.g. the tenant) of the VM. This may be difficult given the protected nature of various encryption schemes. In particular, a goal of encryption is to prevent large numbers of entities from being able to decrypt an encrypted VM by protecting the secrets used to decrypt. Thus, there are challenges with having two different entities being able to decrypt an encrypted VM.

The subject matter claimed herein is not limited to embodiments that address any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for managing encrypted datasets. The method includes obtaining a first decryption key. The first decryption key is configured to be used to decrypt an encrypted dataset that has been encrypted using a first encryption mechanism. The first encryption mechanism is associated with the first decrypt on key that can be used to decrypt the dataset. The me hod further includes encrypting the first decryption key with a second encryption mechanism. The second encryption mechanism is associated with a second decryption key used by a first entity, such that the second decryption key can be used by the first entity to decrypt the dataset by first decrypting the first key encrypted key using the second decryption key, and then using the decrypted first key to decrypt the dataset. The method further includes encrypting the first decryption key with a third encryption mechanism. The third encryption mechanism is associated with a third decryption key used by a second entity, such that the third decryption key can be used by the second entity to decrypt the dataset by first decrypting the first key encrypted key using the third decryption key, and the using the decrypted first key to decrypt the dataset. The method further includes creating a package comprising at least the first decryption key encrypted with the second encryption method and the first decryption key encrypted with the third encryption method. The method further includes signing the package with a guardian signature and signing the package with a signature created from the first decryption key.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
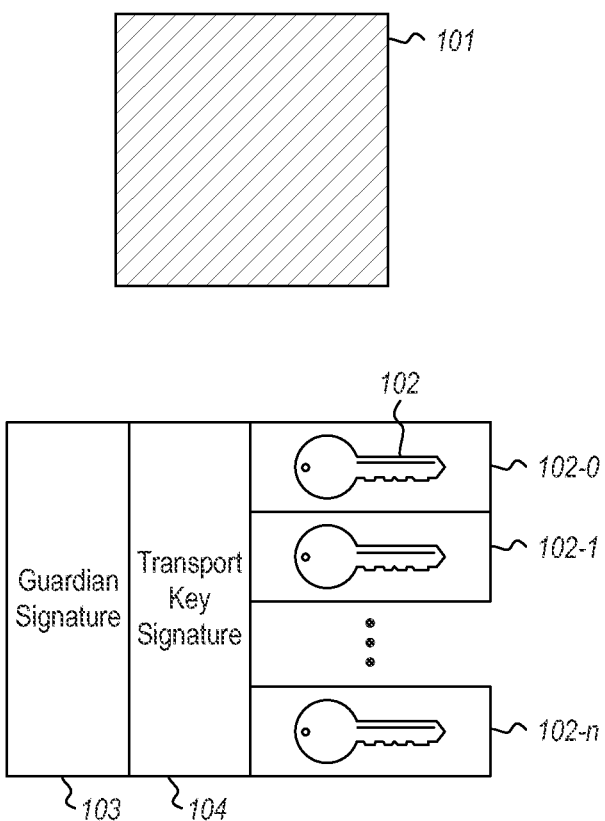
FIG. 1 illustrates an encrypted dataset and a package with encrypted keys for decrypting the encrypted dataset.

A simple illustration of one embodiment of the invention is illustrated with reference to FIG. 1. FIG. 1 illustrates an encrypted dataset 101. The encrypted dataset 101 can be decrypted using a transport key 102. In the example illustrated, multiple copies of the transport key 102 are encrypted using encryption schemes particular to particular entities. Thus, for example, a first copy 102-0 is encrypted for an owner such that an owner of the dataset 101 can decrypt the copy, but other entities cannot. FIG. 1 further illustrates n additional copies where each of the n additional copies 102-1 through 102-n are encrypted for custodians (such as entities that may host or store a dataset for the owner) such that each custodian can decrypt their copy, but other entities cannot. In some embodiments, this may be accomplished by using asymmetric encryption techniques. Thus, for example, the first copy 102-0 is encrypted using a public key for the owner such that the owner can use its private key to decrypt the first copy 102-0. Similarly, the copy 102-1 may be encrypted using a public key for a first custodian, such that the first custodian can decrypt the copy 102-1 using the custodian's private key. Similar encryption and decryption may be done for the remaining custodian copies.

The copies are packaged together and signed with a guardian signature 103 using a cryptographic keyed hash or digital signature to ensure that the package has not been tampered with. The guardian, the entity that signs the copies, may be for example the owner or a custodian, and can change as the encrypted dataset 101 is transferred and/or re-encrypted. The guardian signature can cryptographically bind the package together to ensure that dataset 101 cannot be exposed to unauthorized entities. The package also includes a transport key signature 104 that is a form of authentication that is created by performing a cryptographic hash or other function (such as a message authentication code (MAC) function) of the transport key that can be used as proof of the guardian's knowledge of the transport key.

Illustrating now a more detailed example, some embodiments illustrated herein are directed to securely deploying encrypted virtual machines (VMs) to a host in a datacenter in a fashion that allows both the host to decrypt the encrypted VM and a tenant owner of the VM to able to decrypt the encrypted VM. This can be accomplished by the system encrypting the VM with a decryption key, and two (or more if desired) copies of the VM decryption key for the VM being created. One copy of the VM decryption key is encrypted using a tenant public key (allowing the tenant to decrypt the VM decryption key using the tenant private key, and then to decrypt the VM using the VM decryption key) while the second copy of the VM decryption key is encrypted using a key distribution service (KDS) public key (which allows the host to obtain the VM decryption key with help from the KDS). Additionally the two encrypted keys can be appropriately wrapped, such as using the guardian signature 103 and a transport key signature 104 as described above to ensure that tampering has not occurred.

Figure 2:
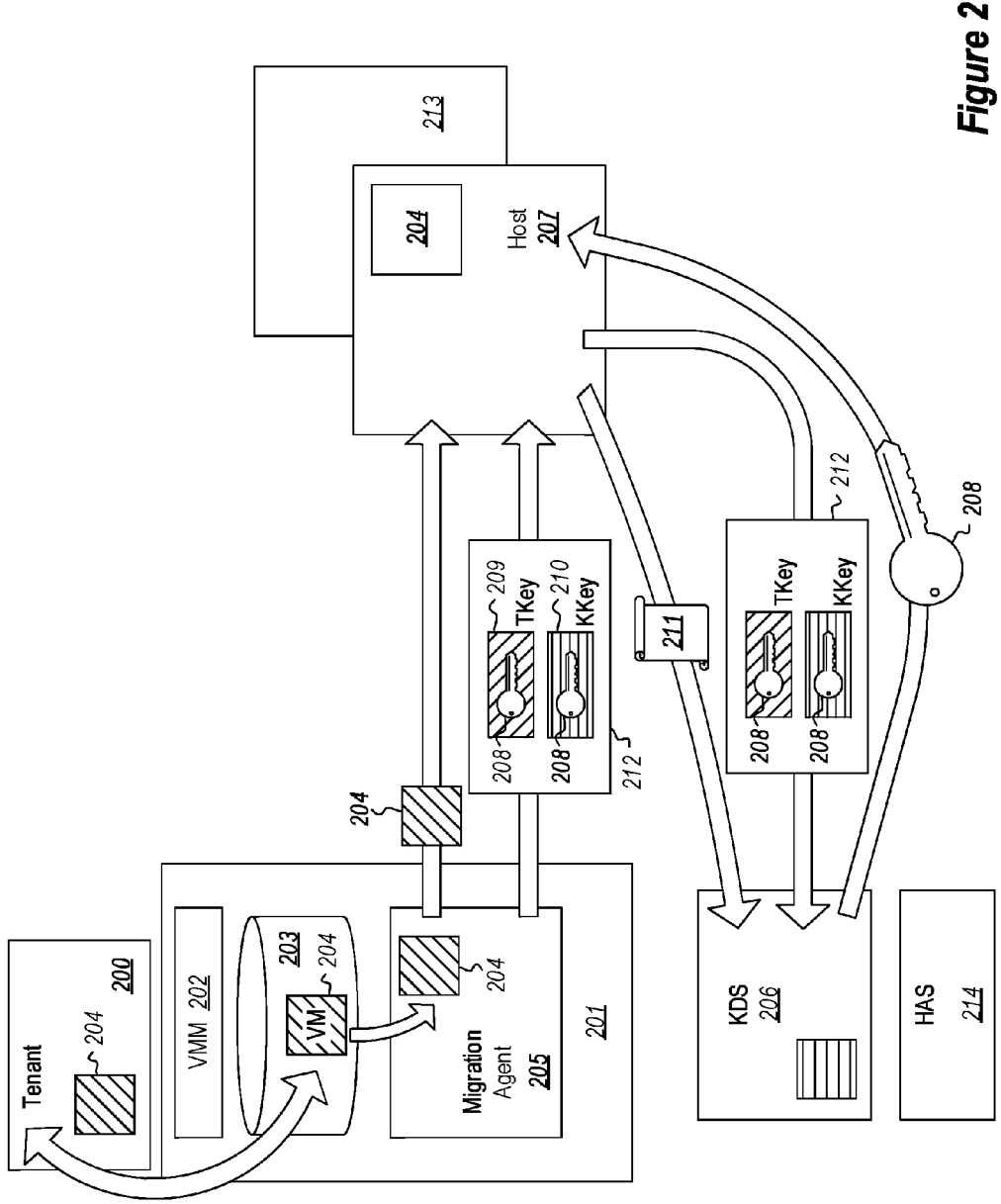
FIG. 2 illustrates deploying encrypted virtual machines.

While the above summary is in the context of deploying virtual machines in a datacenter environment, it should be appreciated that embodiments may be implemented in other scenarios as well The virtual machine example is illustrated in FIG. 2, which illustrates a tenant 200, a cloud service 201, a virtual machine manager 202, virtual machine storage 203, a virtual machine 204, a migration agent 205, a KDS 206, and a host 207. In the illustrated example, the virtual machine 204 is encrypted as illustrated by the cross hatching of the virtual machine in the virtual machine storage 203. The virtual machine storage 203 is a storage system maintained by a cloud service provider 201. The tenant 200 provides VMs to the cloud service provider 201, which can store them in the machine storage 203. The tenant 200 may encrypt the VMs or the VMs may be encrypted by other entities.

The migration agent 205 (or another appropriate entity, e.g. the tenant 200) provides two copies of the key needed to decrypt the encrypted virtual machine 204. The keys may be provided to the migration agent by the tenant 200 or the key distribution service (KDS) 206, or some other trusted entity. One copy 209 of the key 208 is encrypted using a public key of the tenant 200, while the other copy 210 of the key 208 is encrypted using a public key of the KDS 206. Various alternatives may be implemented.

The key 208 may be used to decrypt the VM 204 itself. Alternatively, the key 208 may be used to decrypt a virtual trusted platform module (vTPM) (as will be explained in more detail below) which can be used to decrypt the VM 204. However, this still falls within the scope of what is described as the VM being encrypted. In some embodiments, the VM 204 may be encrypted by encrypting a virtual hard drive (VHD) and/or metadata of the VM 204.

If the tenant 200 desires to retrieve and read the encrypted VM 204, the tenant can simply request the encrypted VM 204 back from the virtual machine storage 203 and use its private key to decrypt the first copy 209 of the key 208, and then use the key 208 to access the VM 204.

To deploy the VM 204 to the host 207, the encrypted VM is sent to the host 207. Additionally, a package 212 including the encrypted copies 209 and 210 of the key 208 is sent to the host 207.

The package 212 is signed with both guardian signature and a signature for the key 208.

The host 207 sends a request 211 and the package 212 to the KDS 206. Alternatively, along with sending the request 211 to the KDS 206, the host 207 can also send the second copy 210 of the key 208 to the KIDS. Alternatively, the KDS 206 may receive the second copy 210 from another service and can store the second copy 210 in anticipation of the request 211.

In some embodiments, a determination may be made that the host 207 meets certain qualifications, and if the host 207 meets the qualifications, then the key 208 can be accessed by the KDS 206 and sent back to the host 207. For example, embodiments may require the host 207 to meet certain health requirements, such as the host may need to be running certain software (or certain version of software), have certain configuration settings, have an appropriate boot record, The host can then use this key 208 to unlock the VM 204 allowing the VM 204 to be deployed on the host 207 (as illustrated by the non-crosshatched version of the VM 204).

The following now illustrates yet additional detail. In flows requiring the use of a Key Distribution Service, a data structure called a. "protection descriptor" or PD is used. The main function of PDs is cryptographic wrapping of an encryption key (e.g., the key 208), called the Transport Key. This wrapping ensures that access to the key is only granted to authorized entities. The KDS 206 does not know or care what data the transport key protects.

By way of illustration, an owner of a Virtual Machine (VM) may wish to deploy the VM to a hoster. The VM comprises two sets of data a metadata section and a set of virtual hard drives (VHDs). The VHDs are encrypted using an appropriate encryption technology, such as BitLocker available from Microsoft Corporation of Redmond Wash. The full volume encryption key (FVEK) used to decrypt the primary VHD is protected by a virtual trusted platform module (vTPM), the state of which is encrypted and stored as part of the metadata, alongside the PD. The vTPM state is itself encrypted using a key wrapped by the PD. This allows the owner to protect the VM from unwanted access to the VM.

When a host at a hoster needs to launch a VM, it extracts the PD for the vTPM from the metadata and sends it to the KDS. If the host is authorized for the vTPM key, the KDS will return to a Trusted Execution Environment (TEE), such as a secure subsystem of the host, the key with which the vTPM can be decrypted. Various different secure subsystems may be jointly or alternatively be used. In one embodiment, this subsystem could be implemented as functions running in the kernel of the host VM. In another implementation it could be running in the hypervisor. In other embodiments it could be implemented as a separate address space enforced by the hypervisor using memory mapping capabilities of the processor (sometimes referred to herein as virtual secure mode (VSM)). In other embodiments it could be implemented as a separate execution area enforced by the processor such as the TrustZone of the ARM architecture, the emerging SGX capability described by Intel Corporation of Santa Clara, Calif., or Trusted Platform Module (TPM) technology). These different implementations can offer similar functionality, such as the capability to do cryptographic operations, store credentials, validate the integrity of code or data, and protect secrets. However, they may differ in the security properties they offer.

Alternatively, in some embodiments, if the VM is accessed in the VM owner's environment, the KDS is not involved in releasing the key as the PD contains a wrapping of the transport key that allows direct access by the owner of the VM. Notably, the KDS may be maintained by the cloud service 201 in some embodiments, but may be maintained by a third party in other embodiments.

The entities authorized to receive the key are either the "owner" or zero or more "custodians". The main distinction between the two is that, in some embodiments, owners get to create the original PD; also, in some embodiments, only owners can be expressed in PDs using self-signed certificates. PD design pays attention to impostor detection: care is taken to ensure that an unauthorized entity cannot pose as the owner or a custodian of a PD. Finally, provisions are made for recovery from key compromise. For example, this may be accomplished by using different lifetime keys where the owner is represented by a long term key that is highly protected and that key is used to sign for shorter term owner keys that might not be offered the same degree of protection. The short term key becomes, effectively, a custodian (i.e. an owner as custodian.)

Embodiments may also include automatic key rolling. Every time a KDS 206 is asked to crack open a PD, it is because some entity (such as a fabric host) is trying to read an encrypted piece of data. Such an operation is associated with an "ingress" flow, such as migrating in a VM or creating a new protected VM from some encrypted "customization data". The KDS 206 responds to such requests with the requested key as well as another PD—the one used in a subsequent "egress" flow, usually meaning migration of a. VM to another host 213 or to offline storage (e.g. machine storage 203). This setup ensures that the KDS 206 has to be contacted only once—on ingress, and that is when the host health is evaluated. Additional host evaluation is not done on egress if the KDS is not contacted more than once. However, embodiments may allow multiple round trips to the KDS 206 as there is no harm in this occurring. Host evaluation may be performed each time embodiments contact the KDS. Thus, if the KDS is not contacted on egress, there is no host evaluation on egress either.

In some embodiments, at any point in time, exactly one entity, either the owner or a custodian, is designated the "Guardian" of the PD—that is the entity that has created and signed the PD (e.g. as illustrated at 103). As the PD moves from the owner to a custodian and from one custodian to another, the guardianship will change. However, the guardianship will stay the same so long as the same KDS 206 handles the PD. Any custodian or owner can "take over" an existing PD (become its guardian) without the current guardian being involved.

The following illustrates a mathematically rigorous illustration of one example. The section will make use of the following notation;

$K_O$, $K_i$, ST, TT—entities involved in the flows (tenant $K_O$, custodian $K_i$, source TEE ST, target TEE TT)

$N_{EPub}$, $N_{EPri}$—public and private encryption keys of some entity N; $N_E$ is shorthand for $N_{EPub}$ $N_{SPub}$, $N_{SPri}$—public and private signing keys of some entity N; $N_S$ is shorthand for $N_{SPub}$ $\Sigma_{M_S}^{SN} N_K$—certificate of an entity N (owner or custodian) specifying subject name of the entity SN and its public key (signing or encryption) $N_K$, issued by entity M by signing with its private key $M_{SPri}$ (the signing key could sign the corresponding public key for a self-signed certificate)

$TK_i$, $TK_e$—symmetric transport keys (e.g. $TK_i$ might be an ingress key and $TK_e$—an egress key); in some embodiments, transport keys are not intended to be used directly but rather as inputs into a key derivation function to produce encryption and authentication keys for various portions of the overall protected VM payload, however, different key derivation schemes may be used $\epsilon(K)[M]$—message M encrypted using key K; K might be symmetric or asymmetric, depending on context $\alpha(K)[M]$—Message M authenticated using symmetric key K $\sigma(K)[M]$—Message M signed using asymmetric key K M1||M2—Concatenation of messages M1 and M2

Further, the shorthand in flow descriptions will use variables to represent more complex messages; specifically on ingress into a host one is likely to deal with messages described below:

TK-e:=KDF(TK, "e")—derived encryption key (KDF stand for "key derivation function". "e" is an input to the KDF used to, e.g., differentiate derivation of encryption key from derivation of, e.g., signing key. However, it should be noted that this only one example, and any other appropriate input can be used just as well.)

This is a symmetric key derived from TK for purposes of encrypting the payload

Note that several such encryption keys may have to be derived from a single transport key, corresponding to different parts of a protected VM payload (e.g. encrypted vTPM state is only one such part)

TK-a:=KDF(TK, "a")—derived authentication key

This is a symmetric key derived from TK for purposes of authenticating the payload via e.g. an HMAC function Note that it may be necessary to derive several such authentication keys from a single transport key for purposes of authenticated encryption A:=$\epsilon$(TK-e)[P]||$\alpha$(TK-a)[P]—encrypted and authenticated payload P Authenticated and encrypted payload (such as vTPM state) created using an encryption key and its companion authentication key corresponding to a transport key TK While in the example illustrated here, a separate authentication key and encryption key are illustrated, is should be appreciated that in other embodiments, some cryptographic algorithms allow the same key to be used for both encryption and authentication. Thus data structures illustrated herein can be simplified in other embodiments.

The PD will include multiple wrappings of the transport keys—one by the owner (below this will be called a message of type "B") and zero or more wrappings by custodians, which are delegated by the owner (these are messages referred to as type "C").

B:=$\Sigma_{K_{0S}}^{SK_0} K_{0S} || \Sigma_{K_{0S}}^{SK_0} K_{0E} || \epsilon(K_{0E})[TK]$—owner wrapped key This is the transport key encrypted to the owner of the VM; it allows the VM to be picked up by its owner at any point in time Only owner's entry can contain an undelegated (self-signed) certificate over the signing key There are three parts to this message—the certificate over the owner's signing key, an owner-issued certificate over the owner's public encryption key and the encryption of the transport key using the public encryption key (The certificate over the owner's signing key can be self-signed, but is does not need to be self-signed and could be issued by a certificate authority that is mutually trusted by all parties.)

C:=$\Sigma_{K_{jS}}^{SK_j} K_{jS} || \Sigma_{K_{jS}}^{SK_j} K_{jE} || \epsilon(K_{jE})[TK]$—custodian wrapped key This is the same transport key encrypted to a custodian of the VM $K_j$ is the "current" custodian to which the transport key is encrypted $K_i$ is the "previous" custodian in the chain (i==0 for owner), which delegates custodian authority to $K_j$ There could be zero or more custodians for a VM, so zero or more messages of type C inside a PD Different wrappings of the transport key are combined into a set, illustrated below as a matrix, where each row contains a number of concatenated entries corresponding to an owner or a custodian. The owners are identified as such (using the letter "o"). The current guardian is flagged as such with an asterisk. In the example illustrated below, the PD is in the shape it exists in when first created by the owner for consumption by the KDS 206. The combination of different wrappings of the key is a message of type D. The message generated by the owner for a single custodian would look like:

$$D_0 := \begin{pmatrix} *o \Sigma_{K_{0S}}^{SK_0} K_{0S} || \Sigma_{K_{0S}}^{SK_0} K_{0E} || \epsilon(K_{0E})[TK] \\ --\Sigma_{K_{0S}}^{SK_1} K_{1S} || \Sigma_{K_{1S}}^{SK_1} K_{1E} || \epsilon(K_{1E})[TK] \end{pmatrix}$$

The KDS 206 can consume this message, make itself the guardian and add additional custodian(s), resulting in a PD that looks as follows:

$$D_1 := \begin{pmatrix} -o \Sigma_{K_{0S}}^{SK_0} K_{0S} || \Sigma_{K_{0S}}^{SK_0} K_{0E} || \epsilon(K_{0E})[TK] \\ * -\Sigma_{K_{0S}}^{SK_1} K_{1S} || \Sigma_{K_{1S}}^{SK_1} K_{1E} || \epsilon(K_{1E})[TK] \\ --\Sigma_{K_{1S}}^{SK_2} K_{2S} || \Sigma_{K_{2S}}^{SK_2} K_{2E} || \epsilon(K_{2E})[TK] \end{pmatrix}$$

integrity and authenticity of the message of type D is provided by a message of type E. This message serves as proof that the guardian did in fact have the knowledge of the key protected by message of type D and did in fact author the message.

$E_i = \alpha$[TK-a] $(D_i) || \sigma(G_{SPri})[D_i]$ where $G_{SPri}$ is the private signing key of the entry in message D which is marked as the "guardian".

Finally, a message of type F is the actual "PD"—the concatenation of messages D and E:

F:=D||E

In some embodiments, the PD data format also includes the header (to communicate information such as the PD blob version number), as well as provisions for cryptographic agility (choice of cipher, mode and key size for each key).

A typical flow involving a PD over some payload includes the host sending a PD $F_i$ of the ingress key $TK_i$ to the KDS, and KDS responding with two pieces of information:

1) A wrapping of two transport keys (ingress and egress—$TK_i$ and $TK_e$) for consumption by the host's TEE. This wrapping involves authenticated encryption of a concatenation of ingress and egress keys:

TW—wrapping key, generated by KDS

TW-e, TW-a—encryption and authentication keys derived from TW

H:=$\epsilon(ST_{EPub})$[TW]||$\epsilon$(TW-e)[$TK_i$||$TK_e$]||$\alpha$(TW-a)[$TK_i$||$TK_e$]

2) An egress key PD $F_e$ built around $TK_e$ to be included with the egress payload. This is not targeted at the host's TEE and can only be cracked by the owners or one of the custodians.

In some cases, the host will provide multiple ingress protection descriptors. In that case, the KDS will ensure that all protection descriptors have the exact same owner (as evidenced from the self-signed certificate at the root of the delegation chain). The resulting egress protection descriptor will be a superset of all custodians from the ingress protection descriptors and message H will look like:

H:=$\epsilon(ST_{EPub})$[TW]||$\epsilon$(TW-e)[$TK_{i1}$||$TK_{i2}$|| . . . ||$TK_{in}$||$TK_e$]||$\alpha$(TW-a)[$TK_{i1}$||$TK_{i2}$|| . . . ||$TK_{in}$||$TK_e$]

As mentioned already, the KDS 206 has no knowledge of the type of payload that the blob of type F protects. The payload could be vTPM state, provisioning information for a VM, or something entirely different. In some embodiments, the payload is encrypted using an encryption key derived from the "master" transport key, and authenticated using the corresponding authentication key (as illustrated by messages of type A). However, other key derivation arrangements count be constructed to achieve the same or a similar overall effect.

In some embodiments, each host (e.g. hosts 207 and 213) completes attestation before it can either host a VM or participate in migration flows. Upon successfully completing attestation with a host attestation service (HAS) 214, the host is issued a health certificate. The key in the certificate, in some embodiments, is a TEE public encryption key for a trusted subsystem of the host. The host subsequently presents the health certificate to the KDS 206, which responds by encrypting sensitive data (e.g. a vTPM encryption key) to the host's TEE. Note that in this case, there is no "authentication" with the health certificate and no proof of possession required by the KDS 206 to authenticate the host. Simply, the host is free to present whatever health certificate it wants, but if it does not have the corresponding private key, it will not be able to understand the response it receives from the KDS.

Figure 3:
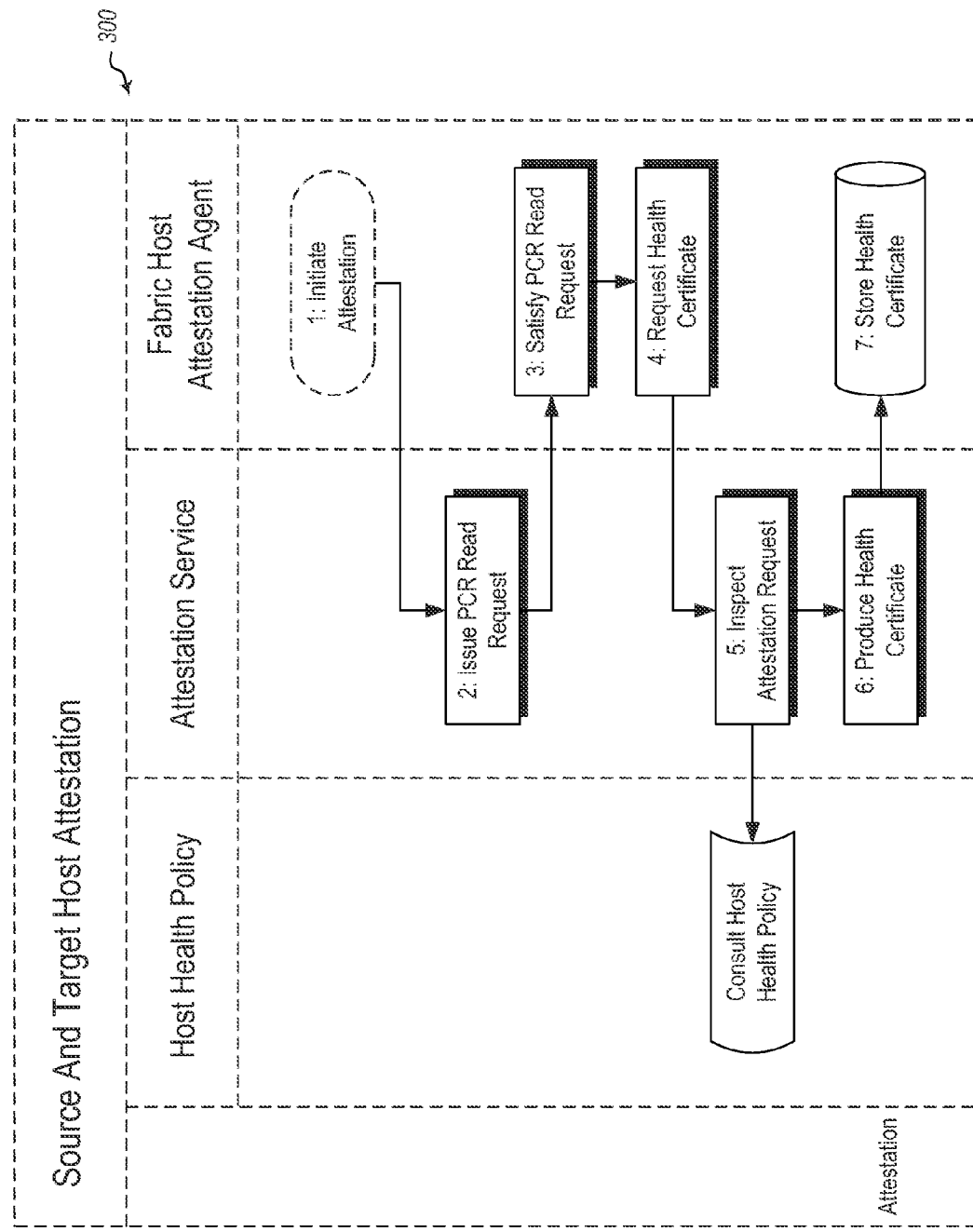
FIG. 3 illustrates attestation operations for hosts and targets.

Reference is now made to FIG. 3, which illustrates a flow 300 for one very specific example. With reference to FIG. 3:

1. The host initiates attestation by contacting the attestation service
2. The attestation service issues a request. In embodiments using TPM technology, this may be a Platform Configuration Register (PCR) read request. This is shown in FIG. 3 as a single request/response exchange but in practice will likely take two legs: one to establish a session and another—to satisfy the request.
   Two different modes of attestation are possible in embodiments using a TPM 2.0 device—one is a traditional Trusted Computing Group (TCG) quote over a service-provided nonce, and another—a "direct PCR read" over an authenticated salted session. Note that is merely one example. In other embodiments, for example, TPM 1.2 could be used, although the direct PCR read functionality would not be available.
3. The device satisfies the PCR read request by supplying values of the requested PCRs together with a TCG Log
4. The device puts together an "attestation request" which comprises a response to the PCR read request
5. The service inspects the supplied TCG log, the PCR values, and optionally consults policy to determine whether the contents of the TCG log supplied by the host are healthy (in addition to simply matching the PCR values)
6. The service produces a health certificate, which internally encodes the TEE public key and a set of measurements of host health as determined by the health attestation service 214.
7. This health certificate is stored by the host for subsequent use in VM launch and migration flows.

Virtual Machine Hosting and Migration

VM migration is a complex flow containing several moving pieces. It involves the source host server, the target host server and a management service that orchestrates the move. This section will focus primarily on key management related to VM migration. VM migration may occur, for example, in one of the following cases:

From one host to another under the purview of the same custodian
From owner to custodian
From one custodian to another
From custodian back to owner In each case, the VM is assumed to traverse hostile territory (network, storage, address space). The way of protecting payload and the PD itself described above achieves safe end-to-end transport of the VM and its key material.

In each VM migration scenario, the protected VM travels in its entirety from one host to another or to/from storage. in one embodiment, the VM comprises the following constituent blocks:

vTPM encryption keys
vTPM state
VM metadata
One or more VHDs
VM memory state
VM device state The vTPM encryption keys (e.g. transport keys or keys derived from the transport keys) are encrypted such that only an owner or custodian of a VM could gain access to them. The transport keys are then handed down to the TEE of the host authorized to see them.

In one illustrative example, the vTPM state is encrypted using the transport key or an encryption key derived from the transport key; the encryption is further authenticated using an authentication key, also derived from the same transport key. The vTPM state and the transport keys that protect it do not leave the TEE of the host unprotected. However, it should be appreciated that this is merely one example, and that there are virtually an unlimited number of ways that keys could be used to protect confidentiality and integrity that fall within the scope of embodiments of the present invention.

Sensitive portions of the metadata could also be authenticated, using a different authentication key, also derived from the transport key (in some embodiments, as a matter of good cryptographic practice, the authentication key used to validate vTPM encrypted state should not leave the TEE, so a separate key is used). More generally, in the illustrated example, all cryptography involving these secret keys is done using either the TEE or one of TEE extensions (such an extension may be the host OS's kernel protected using hypervisor-enforced code integrity). A key hierarchy may be built with the transport key at its root and various portions of the VM state are encrypted using keys in this hierarchy.

The VHD is presumed to be encrypted using the FVEK protected by vTPM, so migration architecture makes no additional attempt to protect it. In addition, it is possible for the tenant 200 to download from the service provider 201 a VM that belongs to that tenant and run it directly, i.e. without involving the KDS 206.

Finally, VM memory and device state are encrypted using keys derived from the master transport key. These can be similarly authenticated using corresponding authentication keys.

Before flows involving protected guest VMs can begin, several prerequisites are satisfied.

1. (OPTIONAL—only for cases where the VMM 202 orchestrates the migration flow) A management service VMM, such as SCVMM available from Microsoft Corporation of Redmond Wash., is up and running, available to both source and target server.
2. The key distribution service 206 and host attestation service 214 are up.
3. Source host server (e.g. host 207) has a guest virtual machine 204 up and running.
4. In case of migration, target host server (e.g. host 213) is TEE capable and is up and running.

A series of steps are taken before any actual migration takes place. Due to extreme time constraints that may exist in some embodiments, hot migration in particular requires that these be taken (sometimes, well) in advance of the actual migration attempt. Note that the list below purposefully lists only new provisions and omits the steps that are well known, such as the source host querying the target for availability of resources to host the new guest VM, etc.

1. Both source host (e.g. host 207) and target host (e.g. host 213) have completed attestation (e.g. such as described above)
2. Target host (e.g. host 213) satisfies the ingress migration policy, otherwise it is not eligible to receive the VM state—it is useful to establish this early on, although adherence of the host to the migration policy should be checked by the KDS 206 at the time of actual migration
3. Successful attestation enables creation of secure communication between root TEEs of source and target hosts (specifically, the migration agent trustlet running inside the root TEE) and the KDS 206 by virtue of the encryption of data between the entities.

Converting Existing VM to Protected VM

A VM in a tenant's environment can be converted to a "protected VM" status by associating it with a vTPM. This is usually expected to be followed by migrating the VM into a service provider's fabric. In some embodiments, to create a protected VM out of a regular VM, the following takes place:

1. A PD for the VM is created and populated with the correct owner and custodian(s)
2. A vTPM is created and optionally certified by issuing an endorsement certificate signed by an appropriate authority, such as for example, the tenant's own certificate authority.
3. An encryption technology, such as BitLocker is enabled on the VM and its VHDs fully encrypted Once the VM's VHDs have been fully encrypted, the VM is "safe enough" to be migrated into the service provider's fabric.

Creation of a brand new PD (as opposed to re-encryption of an existing PD) is different from other flows because in other cases involving PDs, the host authenticates the KDS 206 by having it successfully crack an existing PD. In case of brand new PD creation, this original PD does not yet exist.

Some embodiments may bootstrap the flow around new PD creation by starting with a "null" PD—a known ingress key wrapped by the owner and every allowed tenant. This null PD's guardian is the owner itself. The PD is available to any of the tenant's hosts tasked with VM creation. To create a PD for the new VM, the host submits the null PD to the KDS, which returns two keys (a known key for ingress, plus a new egress key) as well as a PD around the egress key. This egress key is used by the host to migrate the VM out to machine storage 203 (or other storage) or to the service provider.

Following creation of the egress key, the host can create and certify a vTPM. Once the vTPM is created and certified, it can be attached to the VM's metadata. The VM's OS is then restarted and the new vTPM virtual device becomes exposed to it on next boot. At that point, the OS is free to encrypt its VHD, such as by using BitLocker.

VM Launch on a Host

Before a host can migrate out a VM, it first needs to load and run it. This is accomplished by downloading a VM from offline storage. The VM's VHD is presumed encrypted (e.g. with BitLocker), and the key is sealed inside the VM's vTPM. The vTPM state is wrapped using a transport key $TK_i$ (message $A_i$) and associated data to help the KDS unwrap the key $TK_i$ for the host (PD $F_i$). Both $A_i$ and $F_i$ are part of VM metadata.

Figure 4:
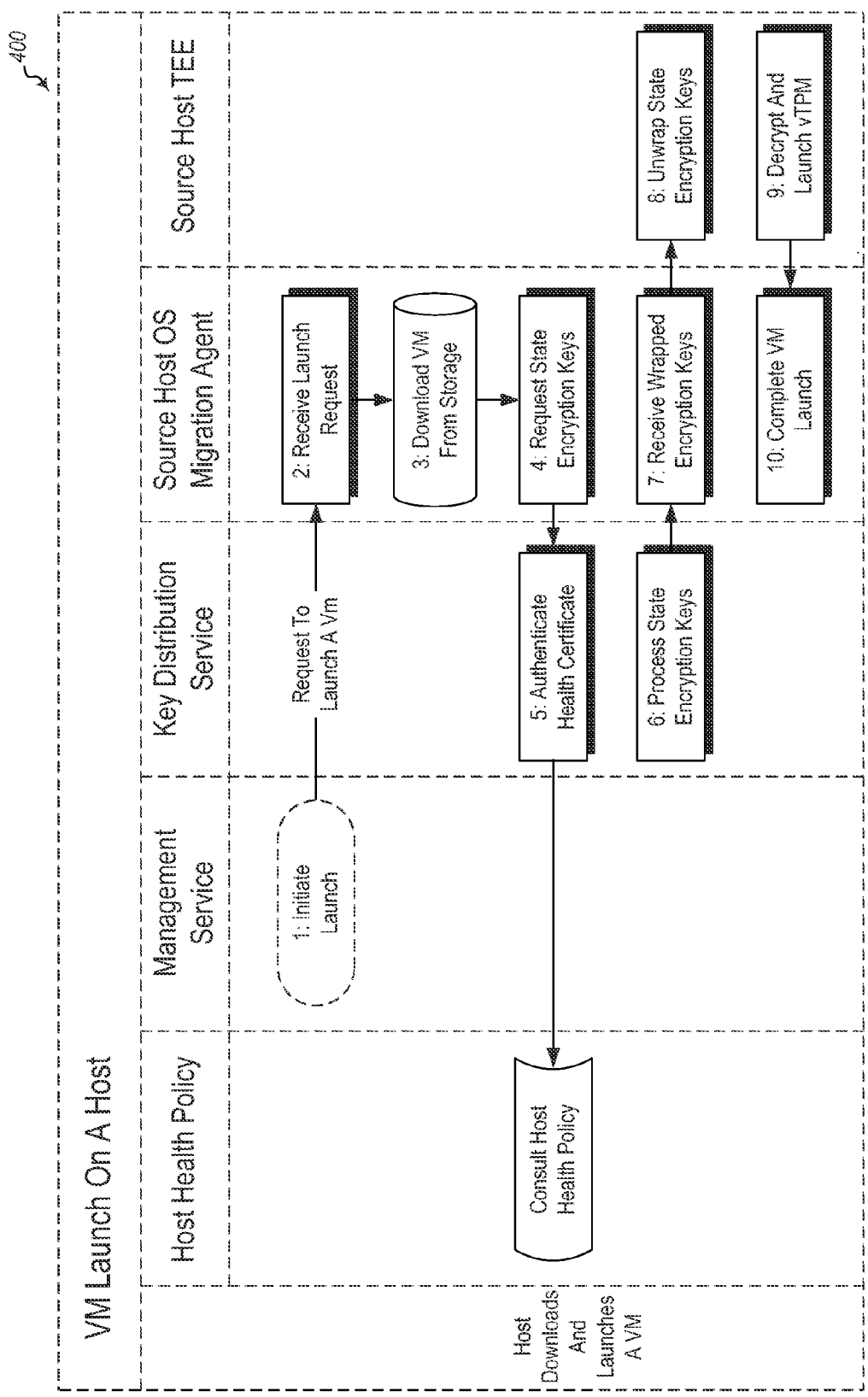
FIG. 4 illustrates a flow for launching a virtual machine on a host.

With reference to FIG. 4, step-by-step, the VM launch flow 400 is:

1. Management service initiates VM launch on a host by contacting it and providing it to a link to the VM to be launched.
2. The host receives the request
3. The host reaches out to offline storage to download the VM
4. After downloading the VM, the host looks inside VM metadata and proceeds to construct a request to the KDS:
   Extracts blobs $A_i$ (wrapped vTPM state) and $F_i$ (PD for vTPM encryption keys wrapped by the KDS)
   Sends to the KDS the PD $F_i$ accompanied by the host's health certificate, which contains its TEE public key $ST_{EPub}$
5. The KDS receives the request and authenticates the health certificate
   Certificate is not expired
   Signature on the certificate is valid (if the certificate is self-signed, the signature matches that of the attestation service; otherwise the certificate comes from a certificate authority (CA) that the KDS recognizes)
   (OPTIONAL) Issuance policies encoded in the certificate correspond to a healthy host per the current host health policy
   NOTE: The KDS does not validate that the request came from the host in possession of the private key corresponding to the health certificate; its response will be encrypted using the requestor's public TEE key and thus useless to an attacker
6. The KDS cracks the blob $F_i$ and computes the response:
   Processes the ingress PD to extract the ingress transport key:
   From $F_i$, extracts $D_i$ and $E_i$
   From $D_i$, extracts $B_i$ as well as zero or more messages of type $C_i$
   Among the messages $B_i$ and $C_i$ locates the row corresponding to the KDS
   Builds a certificate chain starting with the guardian's signing certificate, to make sure all signing key certificates in the chain roll up to the owner's signing certificate (which is the only one that can be self-signed, and if it is not self-signed, verifies that it is signed by a trusted authority such as e.g. Verisign of Reston, Va.)
   It may be beneficial to verify all of the messages $B_i$ and $C_i$.
   From the messages $B_i$ and $C_i$ that correspond to the KDS, decrypts $TK_i$
   From $TK_i$, derives $TK_i$-a
   Using $TK_i$-a, verifies HMAC inside $E_i$ as well as the guardian's signature over the PD
   Generates the egress transport key $TK_e$
   Generates PD for $TK_e$:
   From $T_{EPub}$ (obtained from $B_i$) and $TK_e$, generates $B_e$
   From $K_{EPub}$ and $TK_e$, generates $C_e$ (this is performed for all C messages, of which there may be zero or more)
   From $B_e$ and $C_e$, generates $D_e$; marks itself as the guardian while at it
   Authenticates $D_e$ with $TK_e$-a, resulting in message $E_e$
   Signs $D_e$ using its signing key
   Concatenates $D_e$ and $E_e$ into egress PD $F_e$
   Prepares to send $TK_i$ and $TK_e$ back to the host Generates TW and from that—TW-e and TW-a
From TW, TW-a, TW-e, $TK_i$, $TK_e$ and $STEP_{EPub}$, generates H
The response to the host comprises concatenated messages: $H\|F_e$
7. The host receives the response from the KDS and passes message H to TEE, alongside $A_i$.
8. TEE handles the response from the KDS:
From H, using $ST_{EPri}$, decrypts TW
From TW, derives TW-e and TW-a
Using TW-e, decrypts $TK_i$ and $TK_e$
Authenticates the encryption of $TK_i$ and $TK_e$ using TW-a, thus authenticating the KDS's ability to crack the PD (and thus the authenticity of KDS)
From $TK_i$ derives encryption and authentication keys—$TK_i$-e and $TK_i$-a
Using $TK_i$-e, decrypts vTPM state from $A_i$
Using $TK_i$-a, authenticates vTPM state encryption
9. Once vTPM state is decrypted, TEE launches vTPM
TEE holds on to the value of $TK_e$ until such time when it has to migrate the vTPM out (i.e. compose the message $A_e$ and send $A_e\|F_e$ to the target)
10. Now the host can complete the VM launch sequence Actual Migration In some embodiments, for forward secrecy reasons, each migration instance requires a unique key, good for that migration alone. An important security consideration that is accommodated by this design is that little or no trust is placed in the VMM 202 service.

Figure 5:
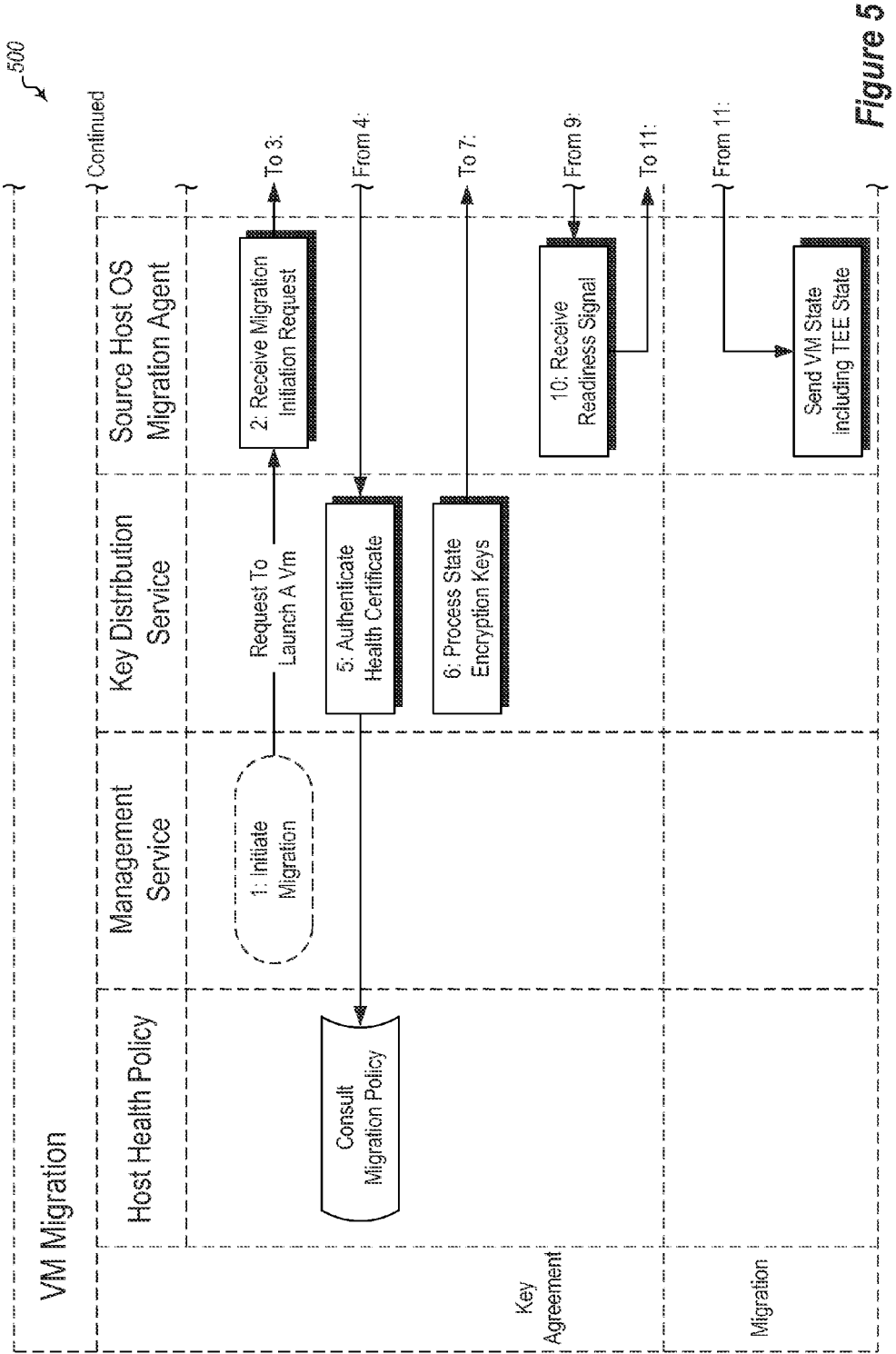
FIG. 5 illustrates a flow for migrating a virtual machine.
Figure 5:
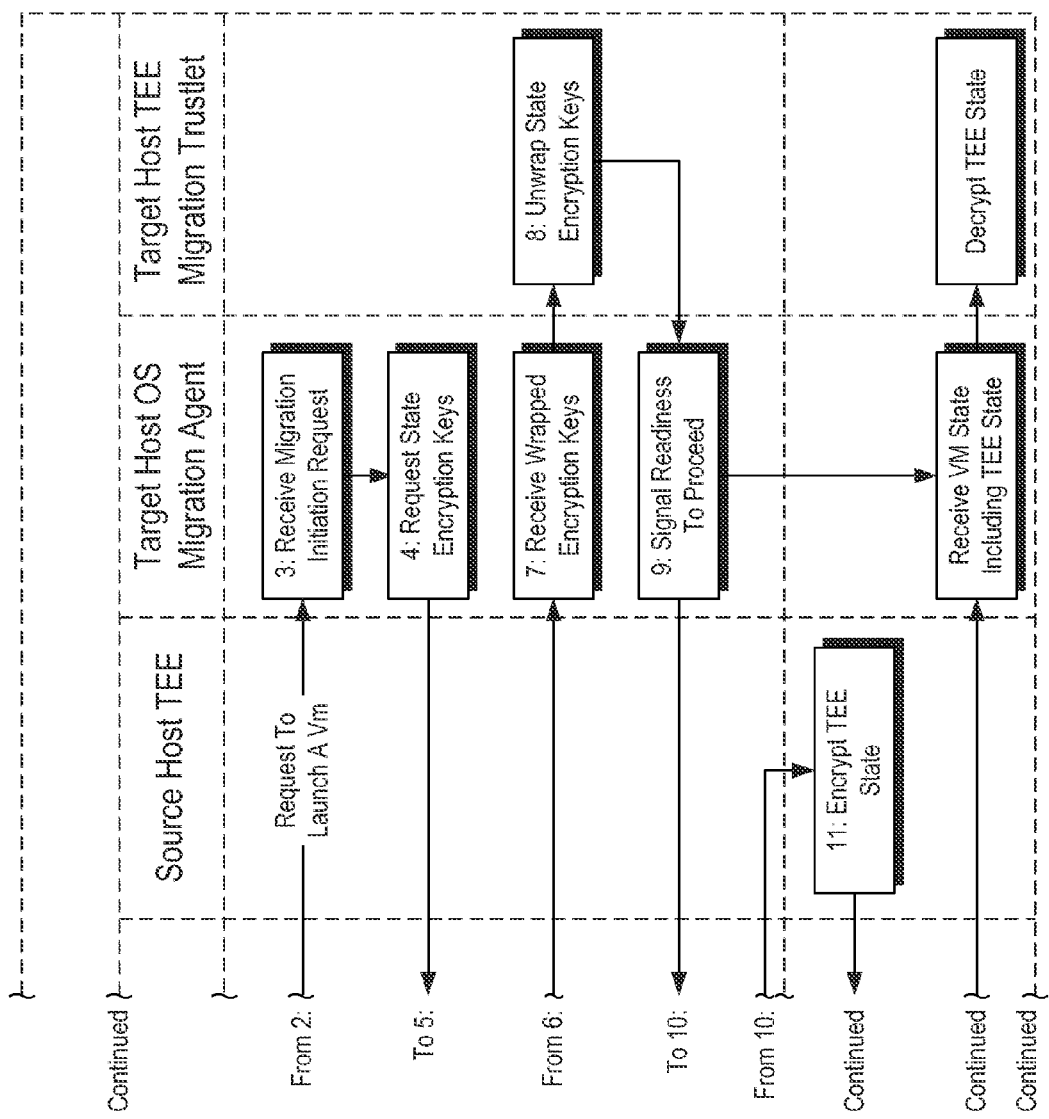

One possible mechanism for migration involving TEE state is illustrated in FIG. 5. The flow 500 illustrated in FIG. 5 utilizes several services: "management service" (such as SCVMM), "attestation service" and "key distribution service". Attestation Service and Key Distribution Service can be co-located since they are equally trusted (and more trusted than SCVMM).

The actual migration starts with "key agreement" followed by actual data transfer.
1. The management service initiates migration by contacting the source host and providing it with the virtual machine ID that is to be migrated and the identity of the target host.
2. The source host forwards the migration request to the target host along with egress transport key PD $F_e$; from the standpoint of the target this is an ingress PD.
3. Target host receives the migration request.
4. Target host requests the KDS to unwrap the transport key for it by sending the message $F_e$ it received from the source host to the KDS alongside its host health certificate.
5. The KDS validates the host health certificate presented by the target host in the same fashion as was described for the source host above.
6. The KDS does similar processing of state encryption keys as was done for VM launch described above, only this time it returns keys $TK_e$ and $TK_{e'}$ instead of $TK_i$ and $TK_e$.
7. The target host receives this response and passes it on to its TEE for unwrapping.
8. TEE of the target host decrypts the key $TK_e$ using its private TEE key $TT_{Epri}$
9. Target host signals to source host its readiness to proceed with actual migration.

This completes the key agreement phase and sets the stage for one last step—actual secure data transfer.
10. Finally, after all the steps above have been accomplished, the two servers can begin transfer of the state—it is encrypted on the source by the TEE migration trustlet, and passed through to the target TEE.
11. TEE on source and target handle vTPM state encryption and encryption using derived keys to transfer the state from one to another.

Virtual Machine Backup and Restore

The backup and restore flow, from the key management and data flow perspective, is very similar to a migration out from the source server to some data-at-rest storage facility, followed (at some later time) by a migration into the target server of same data. The data at rest thus backed up does not require any additional protections, since the flow is already designed to traverse insecure territory. The only requirement is that the VM ID and the encrypted (by KDS) migration key be stored with the VM state, since these are used by the key distribution service to unseal the use of the decryption key necessary for restore.

The requirement for forward secrecy is best served if the host backing up the VM state obtains a new encryption key, and uses that to re-encrypt the VM state prior to backing it up.

Virtual Machine Failover Inside a Cluster

Failover of a VM inside a cluster can also be considered a special case of migration; in that case all nodes in a cluster share the same VM metadata for each VM ID hosted by the cluster, and can thus obtain the migration key from the KDS ahead of any failover. Nodes in a cluster share storage where the VM data is located; since all nodes in a cluster agree on which wrapped VM key to use, key agreement is likewise easy to establish to ensure fast and secure failover. In particular, failover scenarios do not require forward secrecy, so the key with which the vTPM is encrypted does not change for as long as a VM stays within the cluster.

Virtual Machine Migration Between Datacenters

So long as the PD for a VM contains both datacenters as custodians, migration is no different than in the case of tenant-to-service provider case—the receiving custodian cracks open the PD, generates a new PD and sets itself as that PD's guardian. The transport key in the new PD is encrypted to the owner and each custodian, as before.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
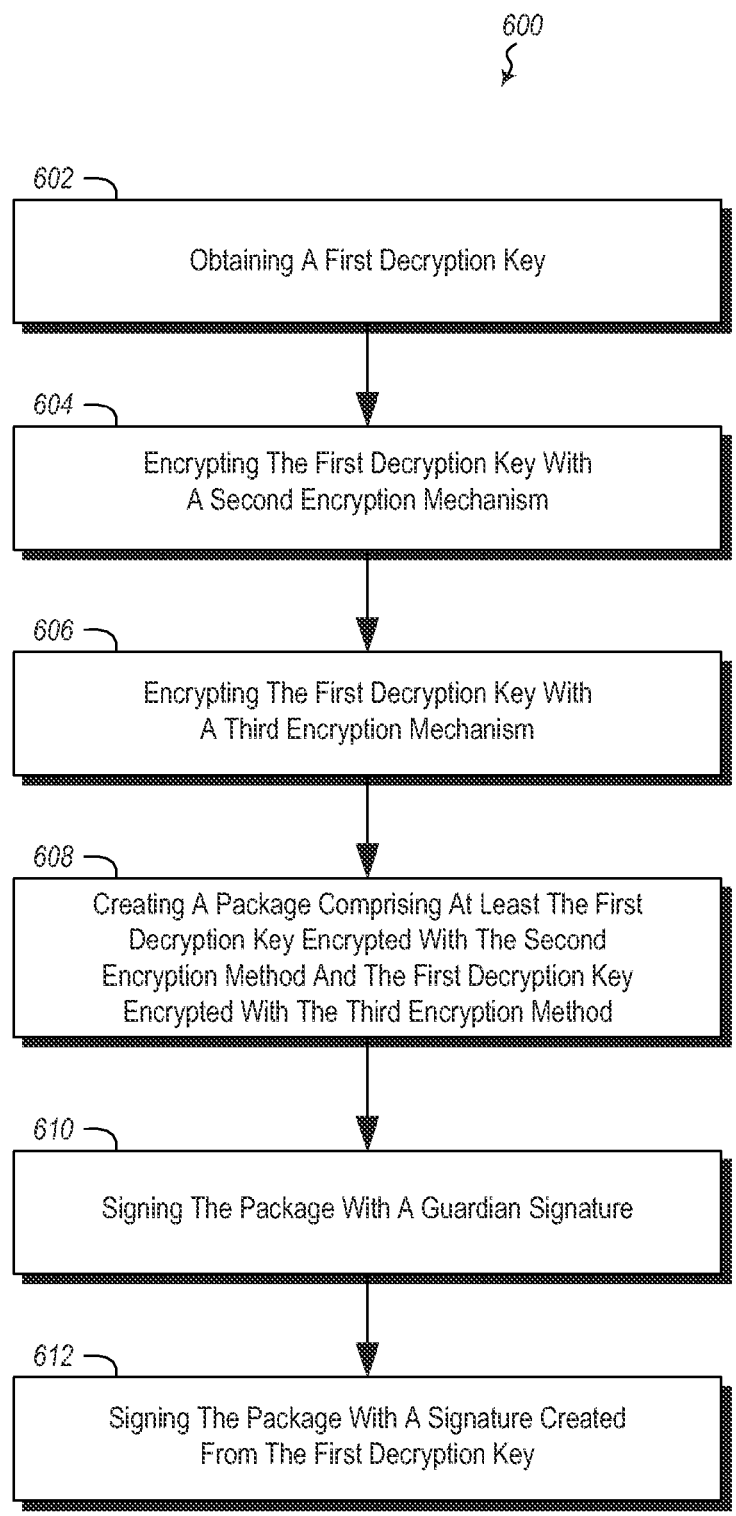
FIG. 6 illustrates a method of managing encrypted datasets.

Referring now to FIG. 6, a method 600 is illustrated. The method 600 may be practiced in a computing environment. The method includes acts for managing encrypted datasets. The method includes obtaining a first decryption key (act 602). The first decryption key is configured to be used to decrypt an encrypted dataset that has been encrypted using a first encryption mechanism. The first encryption mechanism is associated with the first decryption key that can be used to decrypt the dataset.

The method 600 further includes encrypting the first decryption key with a second encryption mechanism (act 604). The second encryption mechanism is associated with a second decryption key used by a first entity, such that the second decryption key can be used by the first entity to decrypt the dataset by first decrypting the first key encrypted key using the second decryption key, and then using the decrypted first key to decrypt the dataset.

The method 600 further includes encrypting the first decryption key with a third encryption mechanism (act 606). The third encryption mechanism is associated with a third decryption key used by a second entity, such that the third decryption key can be used by the second entity to decrypt the dataset by first decrypting the first key encrypted key using the third decryption key, and then using the decrypted first key to decrypt the dataset.

The method 600 further includes creating a package comprising at least the first decryption key encrypted with the second encryption method and the first decryption key encrypted with the third encryption method (act 608).

The method further include signing the package with a guardian signature (act 610) and signing the package with a signature created from the first decryption key (act 612).

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs). Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method of managing encrypted datasets, comprising:
   encrypting a dataset with a transport key encrypted with a first encryption mechanism;
   encrypting multiple copies of the transport key by performing the following:
      encrypting for an owner of the dataset a first copy of the transport key with a second encryption mechanism such that the owner of the dataset is able to decrypt the first copy of the transport key using the second encryption mechanism but entities other than the owner cannot decrypt the first copy of the transport key; and
      encrypting for at least one entity other than the owner a second copy of the transport key with a third encryption mechanism such that the at least one entity can decrypt the second copy of the transport key using the third encryption mechanism but entities other than the at least one entity cannot decrypt the second copy of the transport key;

creating a package comprising the first and second encrypted copies of the transport key;

generating a guardian signature that corresponds to either the owner or the at least one entity other than the owner, wherein the guardian signature cryptographically binds the package to ensure that the dataset is not exposed to unauthorized entities; and generating a transport key signature created from the transport key, wherein the transport key signature further cryptographically binds the package and serves as proof that any entity attempting to access the dataset has knowledge of the transport key.

2. The method of claim 1, wherein the dataset comprises portions of a virtual machine.

3. The method of claim 2, wherein the at least one entity is a hoster of the virtual machine, and the owner of the dataset is a tenant of the hoster.

4. The method of claim 3, wherein the transport key is a master key for the virtual machine or a virtual trusted platform module (vTPM) for the virtual machine.

5. The method of claim 4, wherein the dataset comprises provisioning information for the VM.

6. The method of claim 4, wherein the dataset comprises vTPM state.

7. The method of claim 3, wherein a migration agent forwards the encrypted dataset and the package to the hoster.

8. The method of claim 7, wherein prior to permitting access to the encrypted dataset, the hoster sends a request to a trusted key distribution service (KDS), and wherein prior to acting on the request, the KDS determines whether the hoster meets certain qualifications.

9. The method of claim 8, wherein in addition to the request, the hoster also sends either the package, or the second encrypted copy of the transport key.

10. The method of claim 8, wherein the KDS receives the second encrypted copy of the transport key from another service prior to acting on the request.

11. The method of claim 1, wherein the second encryption mechanism is public key of the owner, and the third encryption mechanism is a public key of the at least one entity other than the owner.

12. A computing environment comprising computer storage media storing executable instructions, and one or more processors which, when executing the computer instructions, cause the computing environment to operate with an architecture configured to manage a dataset encrypted with a first encryption mechanism, and wherein the architecture operates to perform the following:

encrypts multiple copies of the transport key by performing the following:

encrypts for an owner of the dataset a first copy of the transport key with a second encryption mechanism such that the owner of the dataset is able to decrypt the first copy of the transport key using the second encryption mechanism but entities other than the owner cannot decrypt the first copy of the transport key; and encrypts for at least one entity other than the owner a second copy of the transport key with a third encryption mechanism such that the at least one entity can decrypt the second copy of the transport key using the third encryption mechanism but entities other than the at least one entity cannot decrypt the second copy of the transport key;

creates a package comprising the first and second encrypted copies of the transport key;

generates a guardian signature that corresponds to either the owner or the at least one entity other than the owner, wherein the guardian signature cryptographically binds the package to ensure that the dataset is not exposed to unauthorized entities; and generates a transport key signature created from the transport key, wherein the transport key signature further cryptographically binds the package and serves as proof that any entity attempting to access the dataset has knowledge of the transport key.

13. The system of claim 12, wherein the dataset comprises portions of a virtual machine.

14. The system of claim 13, wherein the at least one entity is a hoster of the virtual machine, and the owner of the dataset is a tenant of the hoster.

15. The system of claim 14, wherein the transport key is a master key for the virtual machine or a virtual trusted platform module (vTPM) for the virtual machine.

16. The system of claim 15, wherein the dataset comprises provisioning information for the VM.

17. The system of claim 16, wherein the dataset comprises vTPM state.

18. The system of claim 13, wherein a migration agent forwards the encrypted dataset and the package to the hoster.

19. The system of claim 18, wherein prior to permitting access to the encrypted dataset, the hoster sends a request to a trusted key distribution service (KDS), and wherein prior to acting on the request, the KDS determines whether the hoster meets certain qualifications.

20. The system of claim 19, wherein in addition to the request, the hoster also sends either the package, or the second encrypted copy of the transport key.

21. The system of claim 19, wherein the KDS receives the second encrypted copy of the transport key from another service prior to acting on the request.

22. The system of claim 12, wherein the second encryption mechanism is public key of the owner, and the third encryption mechanism is a public key of the at least one entity other than the owner.

23. One or more physical computer readable storage media comprising computer executable instructions that when executed by at least one of the one or more processors cause they system to perform the following:

encrypting a dataset with a transport key encrypted with a first encryption mechanism;

encrypting multiple copies of the transport key by performing the following:

encrypting for an owner of the dataset a first copy of the transport key with a second encryption mechanism such that the owner of the dataset is able to decrypt the first copy of the transport key using the second encryption mechanism but entities other than the owner cannot decrypt the first copy of the transport key; and encrypting for at least one entity other than the owner a second copy of the transport key with a third encryption mechanism such that the at least one entity can decrypt the second copy of the transport key using the third encryption mechanism but entities other than the at least one entity cannot decrypt the second copy of the transport key;

creating a package comprising the first and second encrypted copies of the transport key;

generating a guardian signature that corresponds to either the owner or the at least one entity other than the owner, wherein the guardian signature cryptographically binds the package to ensure that the dataset is not exposed to unauthorized entities; and generating a transport key signature created from the transport key, wherein the transport key signature further cryptographically binds the package and serves as proof that any entity attempting to access the dataset has knowledge of the transport key.

* * * * *